(12) United States Patent
Park et al.

(10) Patent No.: US 10,948,595 B2
(45) Date of Patent: Mar. 16, 2021

(54) LASER DETECTION DEVICE USING LINE BEAM, AND VEHICLE INFORMATION RECOGNITION METHOD USING SAME

(71) Applicant: GWANGJU INSTITUTE OF SCIENCE AND TECHNOLOGY, Gwangju (KR)

(72) Inventors: Kyi Hwan Park, Gwangju (KR); Sung Ui Hwang, Gwangju (KR); Jun Hwan Jang, Gwangju (KR); Bum Sik Won, Gwangju (KR)

(73) Assignee: GWANGJU INSTITUTE OF SCIENCE AND TECHNOLOGY, Gwangju (KR)

( * ) Notice: Subject to any disclaimer, the term of this patent is extended or adjusted under 35 U.S.C. 154(b) by 405 days.

(21) Appl. No.: 15/759,195

(22) PCT Filed: Sep. 9, 2016

(86) PCT No.: PCT/KR2016/010217
§ 371 (c)(1),
(2) Date: Mar. 13, 2018

(87) PCT Pub. No.: WO2017/043937
PCT Pub. Date: Mar. 16, 2017

(65) Prior Publication Data
US 2018/0252811 A1    Sep. 6, 2018

(30) Foreign Application Priority Data
Sep. 9, 2015    (KR) .................. 10-2015-0127731

(51) Int. Cl.
*G01S 17/04*    (2020.01)
*G08G 1/04*    (2006.01)
(Continued)

(52) U.S. Cl.
CPC ............... *G01S 17/04* (2020.01); *G01P 3/68* (2013.01); *G01S 7/4811* (2013.01);
(Continued)

(58) Field of Classification Search
CPC combination set(s) only.
See application file for complete search history.

(56) References Cited

U.S. PATENT DOCUMENTS 4,830,485 A * 5/1989 Penney ................ G01S 7/4816
250/227.32
8,023,178 B2 * 9/2011 Kodaira ............... G01C 15/004
359/237
(Continued)

FOREIGN PATENT DOCUMENTS

JP    H05209720 A    8/1993
JP    2010139431 A    6/2010
(Continued)

OTHER PUBLICATIONS

PCT/KR2016/010217. International Search Report (dated Dec. 23, 2016).

*Primary Examiner* — Yuqing Xiao
*Assistant Examiner* — Amir J Askarian
(74) *Attorney, Agent, or Firm* — Loza & Loza, LLP; Heidi L. Eisenhut (57) ABSTRACT

A laser beam apparatus that is used for detecting vehicles in an intelligent traffic system according to an embodiment includes: a light source generating a laser beam of a short pulse; an optical transmission system converting the laser beam into a line beam; and an optical reception system receiving a beam dispersed rearward and reflected and returned when the line beam is radiated to a vehicle, and calculating a distance value from a reception time difference between the laser beam and the reflected beam, in which a first lens and a second lens that receive a laser from the light (Continued)

source are sequentially arranged in the optical transmission system, and the length of a horizontal axis of the line beam is increased or decreased to fit to the width of a road to be measured, by adjusting the distance between the light source and the first lens. Accordingly, it is possible to find out the current traffic situation in real time by accurately finding out whether there are vehicles passing through a predetermined area, using the lasers that are radiated from the laser detection apparatus regardless of the sizes of roads.

19 Claims, 10 Drawing Sheets

(51) Int. Cl.
      *G01S 17/10* (2020.01)
      *G01S 17/58* (2006.01)
      *G01S 7/481* (2006.01)
      *G01P 3/68* (2006.01)
      *G08G 1/052* (2006.01)

(52) U.S. Cl.
    CPC .......... *G01S 7/4814* (2013.01); *G01S 7/4816* (2013.01); *G01S 17/10* (2013.01); *G01S 17/58* (2013.01); *G08G 1/04* (2013.01); *G08G 1/052* (2013.01)

(56) References Cited

U.S. PATENT DOCUMENTS

| | | | |
|---|---|---|---|
| 8,477,322 | B2 | 7/2013 | Kawazoe et al. |
| 2002/0191301 | A1* | 12/2002 | Tanaka ............... G02B 27/0977 359/668 |
| 2004/0008514 | A1* | 1/2004 | Lee ........................... G08G 1/04 362/259 |
| 2008/0279082 | A1* | 11/2008 | Shin ......................... G11B 7/14 369/112.03 |
| 2011/0249273 | A1* | 10/2011 | Kawazoe ................ G01S 17/88 356/614 |
| 2015/0055078 | A1* | 2/2015 | Johnstone ............ G02B 3/0081 349/200 |
| 2015/0155728 | A1* | 6/2015 | Feustel ............... F21V 23/0407 362/183 |
| 2016/0196952 | A1* | 7/2016 | Matsumoto ........... H01J 37/295 250/305 |

FOREIGN PATENT DOCUMENTS

| | | |
|---|---|---|
| JP | 2013190898 A | 9/2013 |
| KR | 2001055760000 | 5/1997 |
| KR | 100338121 B1 | 5/2002 |
| KR | 20020065659 A | 8/2002 |
| KR | 20080031071 A | 4/2008 |
| KR | 20130068258 A | 6/2013 |
| KR | 20140011810 A | 1/2014 |

* cited by examiner

FIG. 1

MEASUREMENT AREA ON ROAD

FIG. 2

MEASUREMENT AREA ON ROAD

LASER DETECTION DEVICE USING LINE BEAM, AND VEHICLE INFORMATION RECOGNITION METHOD USING SAME

TECHNICAL FIELD

The present invention relates to a laser detection apparatus for automatically recognizing information on a vehicle passing through a specific area and a vehicle information recognition method using the same and, more particularly, to an apparatus and method that can recognize whether a vehicle passes and the speed of a vehicle from a detection device installed on a road or at an intersection.

BACKGROUND ART

Recently, many projects for designing safety and convenience for users and maximizing efficiency in operating and using traffic systems by applying high technologies to the traffic systems are in progress to construct safer and more convenient traffic systems. Actually, information such as the license plate, the speed, and the type of a vehicle on roads is acquired through high-tech traffic systems on many roads and is used for regulating over-speeding vehicles and over-loaded vehicles. In order to obtain such information, it is required first to detect passing vehicles, and to this end, sensor technologies such as a detector, a radar, an imaging device, and an ultrasonic device are used. In these technologies, a loop embedding method is generally used. According to this method, when a vehicle passes through or is stopped in a detection area set by a loop on a road, the method determines whether the vehicle passes through or is stopped in the detection area by detecting a change in inductance of the loop. However, according to the loop embedding method, it is unavoidable to damage a road for installation and loops are frequently damaged by overloaded vehicles. A Time-Of-Flight (TOF) type laser detector is used as another method of detecting vehicles for compensating for the defects of the loop embedding method.

Figure 1:
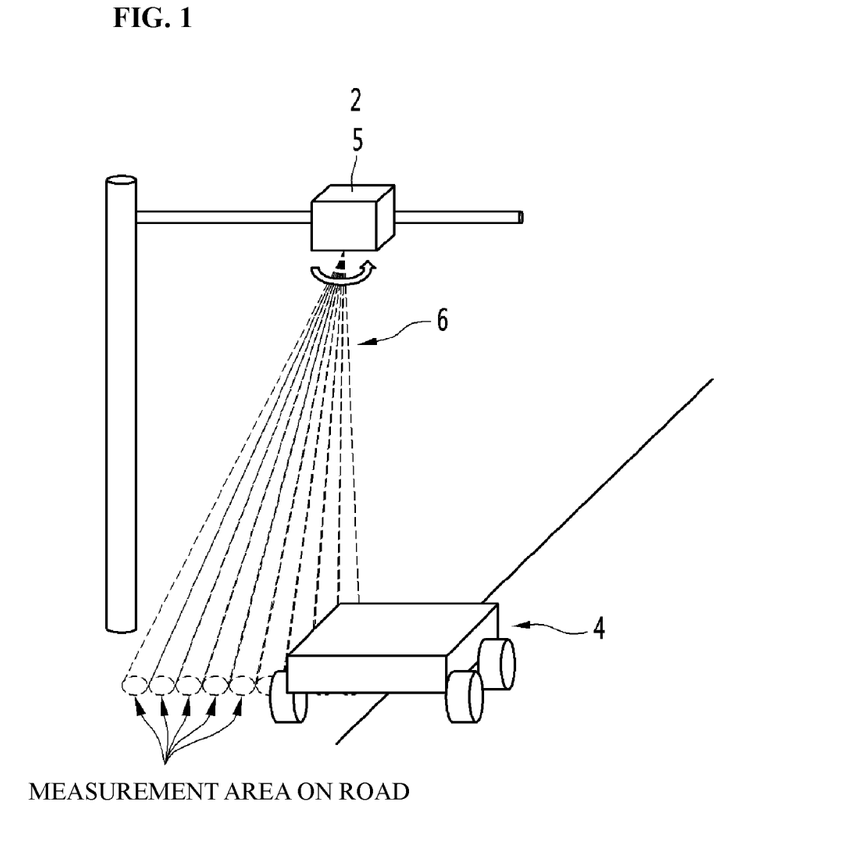
FIG. 1 is a view showing a laser detection system that radiates lasers to detect vehicles in the related art.

FIG. 1 shows a traffic system that radiates lasers for scanning as a method of detecting vehicles in the related art.

According to the traffic system shown in FIG. 1, a laser distance measurer 5 is fixed to a structure extending in the width direction of a road. The laser distance measurer 5 scans the width of the road by radiating laser beams 6 while changing light paths in a predetermined direction, using a rotary reflector. The system radiates the laser beams 6 to points to be scanned and calculates distance values from reflecting laser signals. When a vehicle 4 passes through the area to be scanned by the laser beams 6, the reflective distances of the laser beams are reduced in accordance with the height of the vehicle, whereby it is possible to determine whether there is a vehicle on the road. However, this method requires a driving unit such as a motor for operating the reflector, so there is a problem in that vibration is generated and the performance of the system is deteriorated due to the lifespan of the motor.

DISCLOSURE

Technical Problem

The present invention has been made in an effort to solve the problems and an object of the present invention is to provide a traffic system that can accurately determine whether a vehicle passes through a specific area and the speed of the vehicle.

Another object of the present invention is to provide a traffic system that can find out not only whether vehicles pass through a specific area on a road, but information about vehicles that are running now by finding out the speeds of the vehicles.

Technical Solution

A laser beam apparatus that is used for detecting vehicles in an intelligent traffic system according to an embodiment includes: a light source generating a laser beam of a short pulse; an optical transmission system converting the laser beam into a line beam; and an optical reception system receiving a beam dispersed rearward and reflected and returned when the line beam is radiated to a vehicle, and calculating a distance value from a reception time difference between the laser beam and the reflected beam, in which a first lens and a second lens that receive a laser from the light source are sequentially arranged in the optical transmission system, and the length of a horizontal axis of the line beam is increased or decreased to fit to the width of a road to be measured, by adjusting the distance between the light source and the first lens.

The first lens may change the length of the horizontal axis of the line beam and the second lens may change the length of a vertical axis of the line beam.

The optical reception system may include a fourth lens receiving beams reflected from a vehicle and a third lens aligned with the fourth lens, the size of an image formed on a photo sensor is calculated by calculating magnification of the third and fourth lenses, and the size of the image can be adjusted by adjusting the distance between the fourth lens and the third lens or by changing the size of the third lens.

Advantageous Effects

Since the laser detection apparatus uses a line beam as a light source, it is possible to find out the current traffic situation in real time by accurately finding out whether there are vehicles passing through a predetermined area, using the lasers that are radiated from the laser detection apparatus regardless of the sizes of road. Further, it is possible to find out whether there are vehicles passing through a laser radiation area by measuring the distances between the laser detection apparatus and vehicles passing through the laser radiation area, using line beams. Further, it is possible to find out in more detail traffic flow such as congestion of vehicles on a road, overspeeding vehicle, and overloaded vehicles.

Further, since there is no need for a driving unit such as a motor that is used in the related art, there is no influence by vibration and deterioration of performance due to the lifespan of a motor is not caused, so it is possible to increase the lifespan of the product without frequent replacement.

BEST MODE FOR THE INVENTION

Embodiments of the present invention will be described in detail with reference to the accompanying drawings, but the present invention is not limited or restricted to the embodiments. In the following description of the present invention, well-known functions or configurations may not be described in detail to make the subject of the present invention clear.

Figure 2:
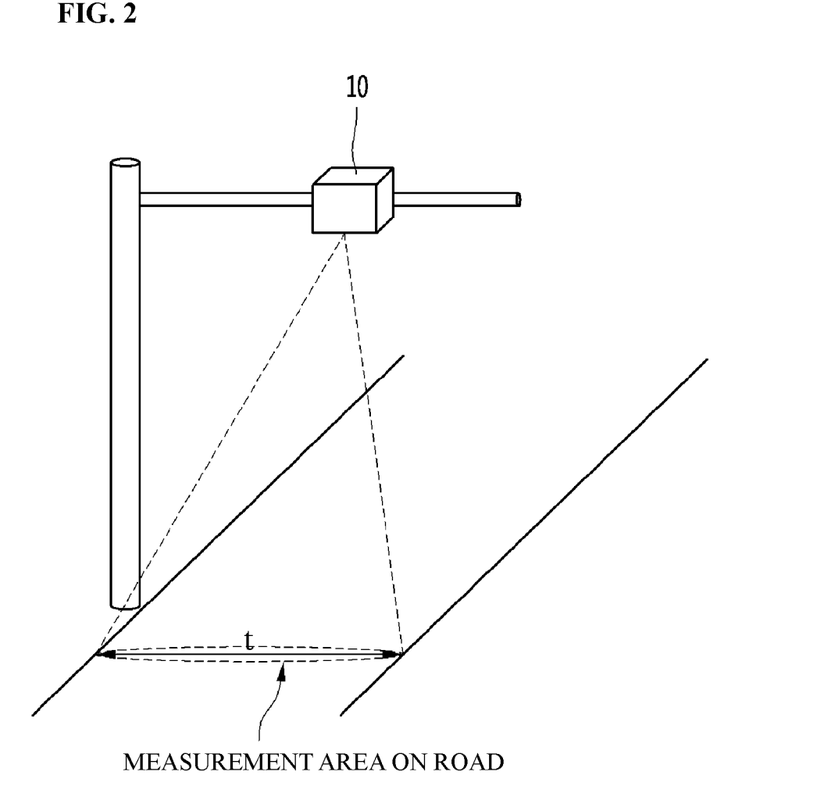
FIG. 2 is a view showing a laser detection apparatus for recognizing a traffic situation according to an embodiment.

FIG. 2 is a view showing a laser detection apparatus according to an embodiment. Although the internal configuration of the laser detection apparatus is not shown in FIG. 2, the laser detection apparatus 10 according to an embodiment may be composed of a light source that radiates line type lasers and an optical system that provides light paths.

According to an embodiment, the entire width of a road may be a detection area by radiating laser beams in a line type throughout the width t of the road. Further, according to an embodiment, it is possible to adjust the lengths of the line type laser beams in accordance with the width t of the road, so it is possible to find out whether vehicles run on the road with the laser detection apparatus regardless of the width t of the road.

Figure 3:
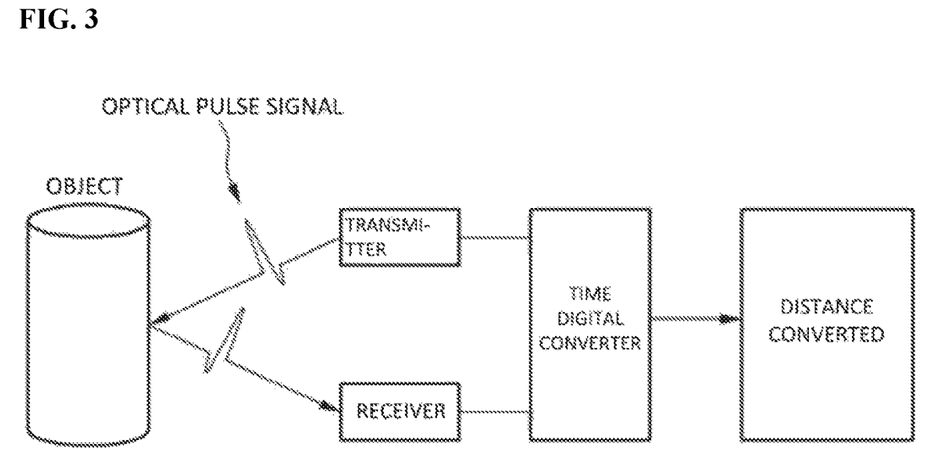
FIG. 3 is a view showing a method of measuring a distance by the laser detection apparatus according to an embodiment.

FIG. 3 is a view showing a method of measuring a distance by the laser detection apparatus according to an embodiment.

Referring to FIG. 3, according to an embodiment, the apparatus acquires distance information, using a Time-Of-Flight (TOF) method. An optical pulse signal transmitted out of a transmitter travels to an object and a receiver receives some of light irregularly reflected from the surface of the object. A time digital converter obtains a time difference between the pulse signal received by the receiver and the pulse signal transmitted out of the transmitter by comparing the signals, changes the time difference into a digital value, and converts the digital value, whereby it can obtain a distance value.

Figure 4A:
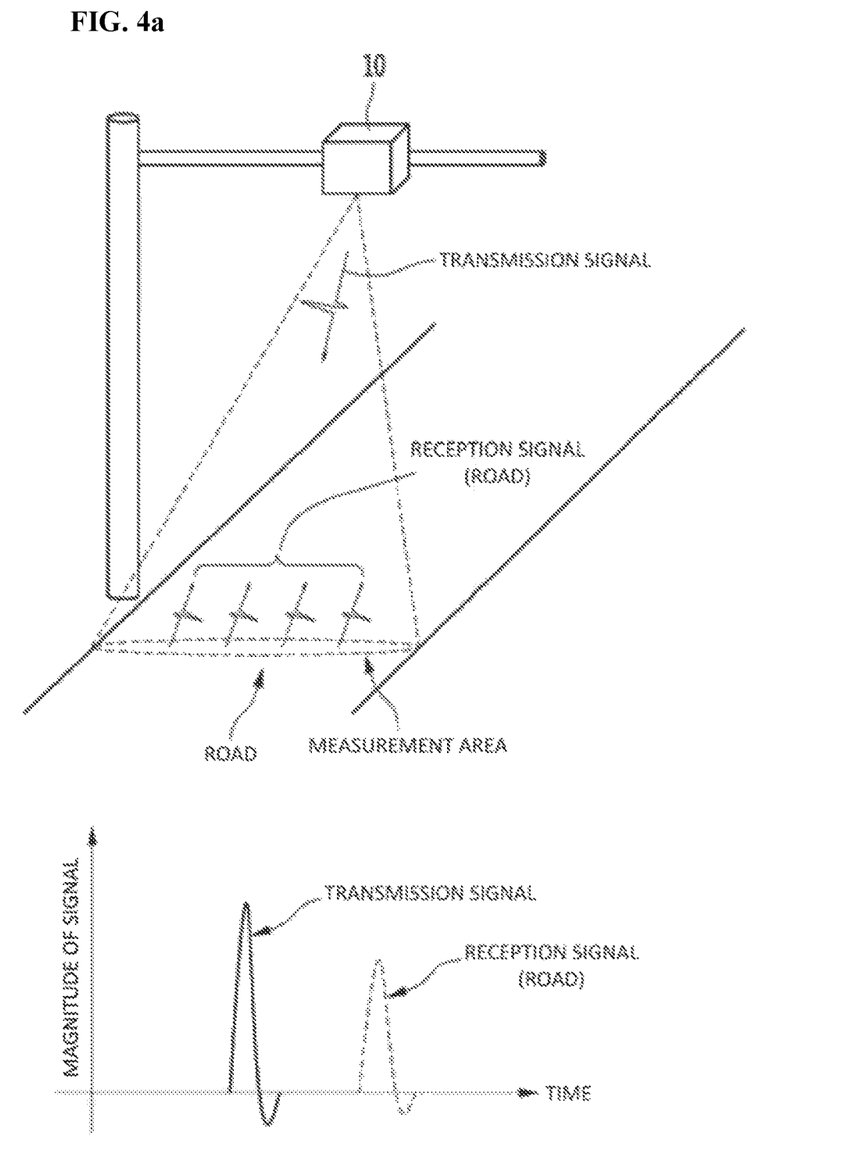
FIGS. 4A to 4C are views showing examples of detecting a vehicle using the laser detection apparatus according to an embodiment.
Figure 4B:
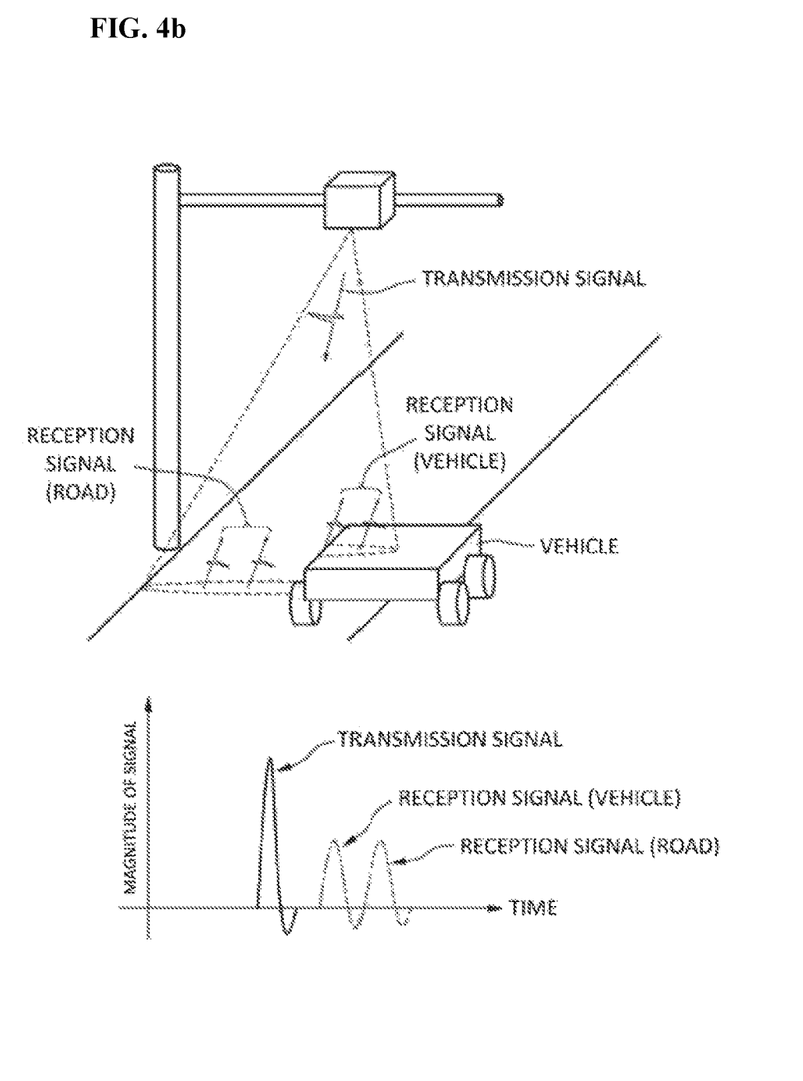
Figure 4C:
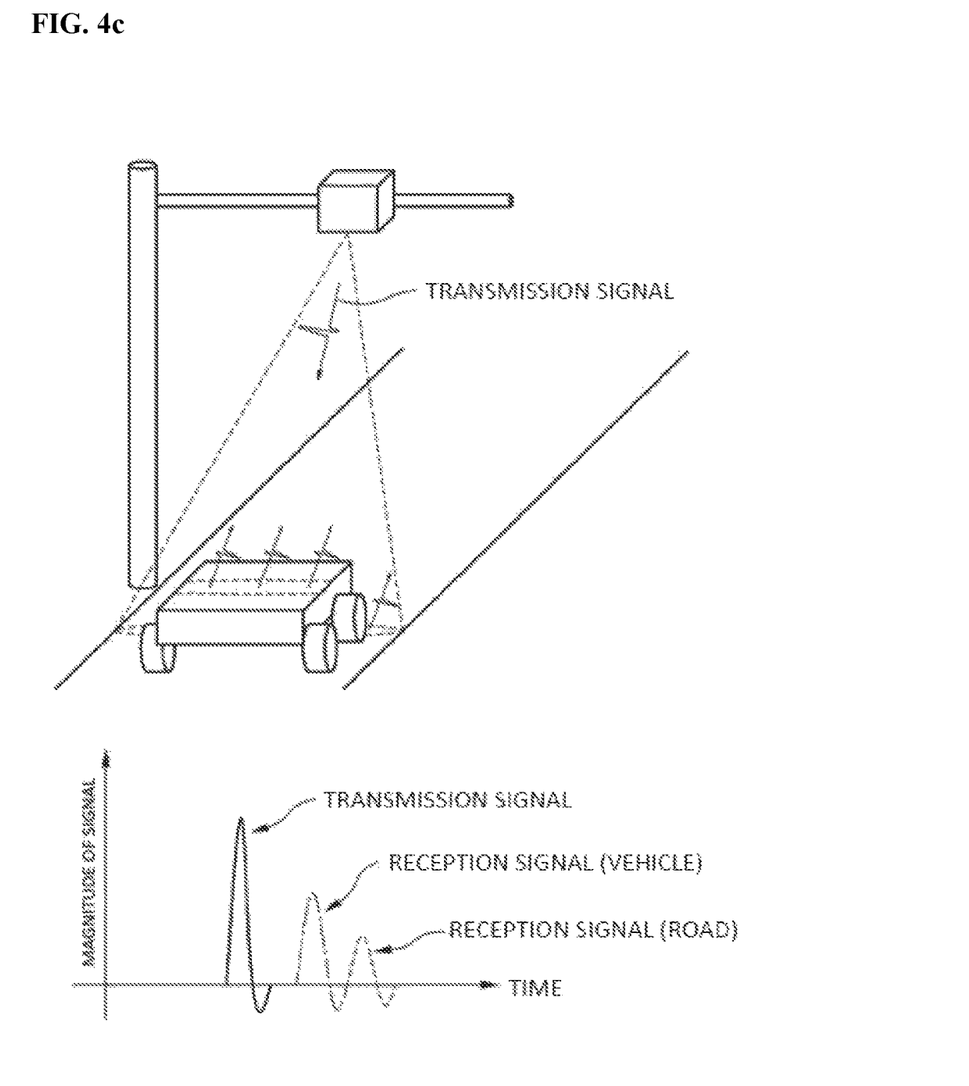

FIGS. 4A to 4C are views showing examples of detecting a vehicle using the laser detection apparatus according to an embodiment.

FIG. 4A shows a case in which there is no vehicle, in which line beams radiated to the road are reflected from corresponding unit areas in the same plane and received by a receiver. Reception signals reflected and returned from the same plane may be considered as one pulse signal.

FIGS. 4B and 4C show a case in which a vehicle enters an area corresponding to some of line beams. In this case, a signal reflected from the vehicle that is relatively close to the laser detection apparatus reaches first the laser detection apparatus and a signal reflected from the road reaches the apparatus with a predetermined time difference. When a signal that is received earlier than a signal reflected from the road is detected, it is possible to determine that there is a vehicle under the laser detection apparatus.

Figure 5:
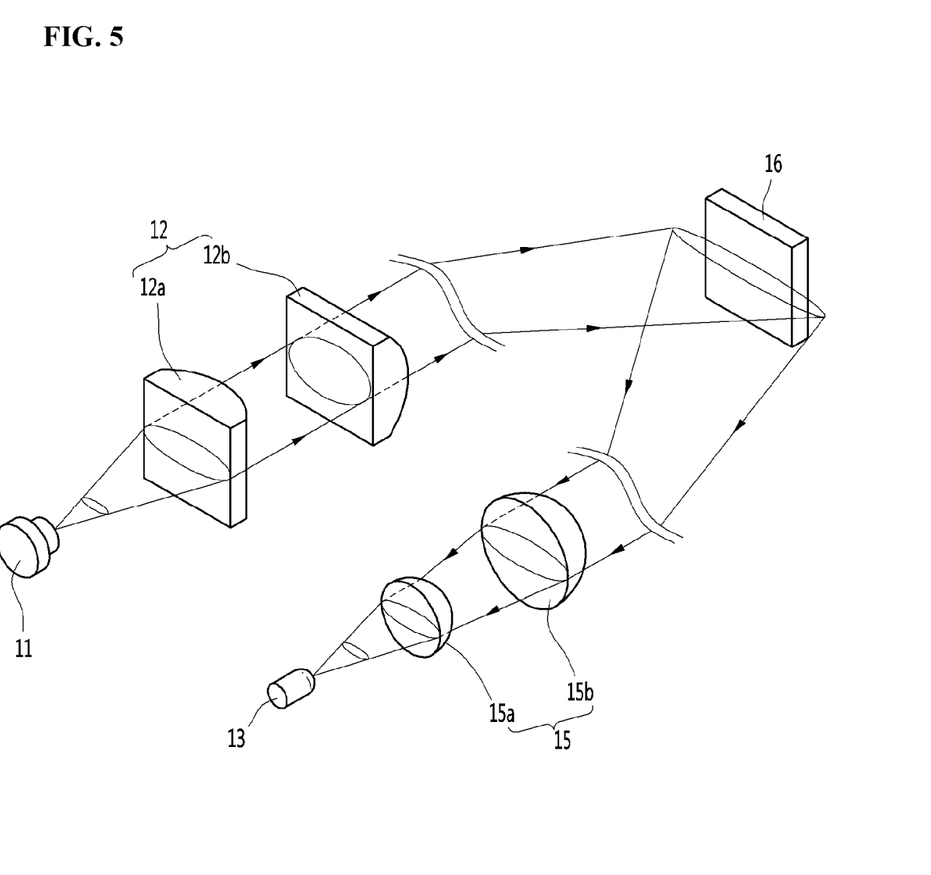
FIG. 5 is a view showing the configuration of an optical system of the laser detection apparatus according to an embodiment.

FIG. 5 is a view showing the configuration of an optical system of the laser detection apparatus according to an embodiment.

Referring to FIG. 5, a laser beam emitted from a laser source 11 is determined in shape through an optical transmission system 12. The optical transmission system 12 is composed of a first lens 12a and a second lens 12b. The size of the horizontal axis of a laser beam is adjusted through the first lens 12b and the size of the vertical axis of a laser beam is adjusted through the second lens 12b. That is, since the lengths of the horizontal axis and the vertical axis of a laser beam are changed, the laser beam passing through the second lens 12b can travel in a line type.

The line beam passing through the second lens travels to an object 16 and a portion of the beam that is irregularly reflected from the irradiated area is received by a photo sensor 13 through an optical reception system 15. The size of the received laser beam is proportioned to the size of the emitted laser beam.

Figure 6:
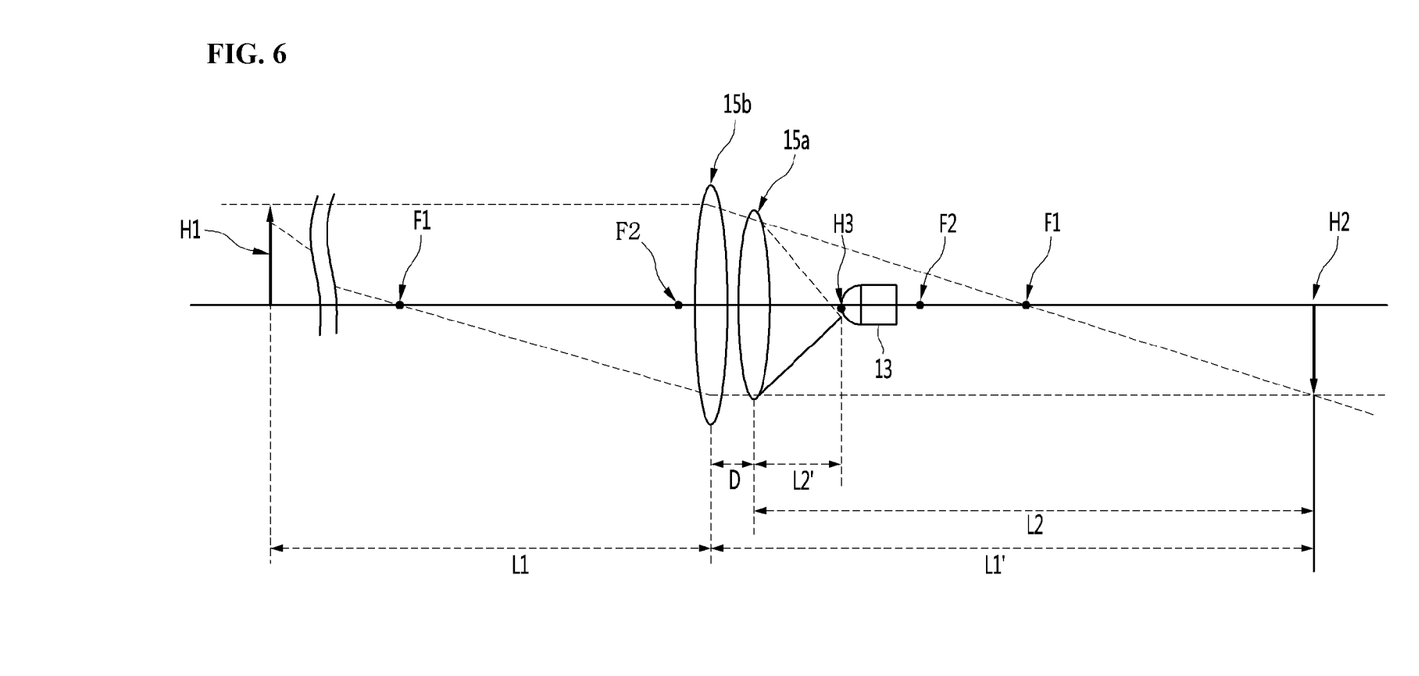
FIG. 6 is a view showing the configuration of an optical reception system of the laser detection apparatus according to an embodiment.

FIG. 6 is a view showing the configuration of an optical reception system of the laser detection apparatus according to an embodiment.

The optical reception system 15 may be composed of third and fourth lenses 15a and 15b. Assuming that H1 corresponding to the half of a line beam size, the focal distance F1 of the fourth lens 15b, the focal distance F2 of the third lens 15a, a measured distance L1, and the distance D between the two lenses are known, the distance L2' from the third lens 15a to an image created through the third lens 15a is calculated by the following Equation 1.

$$L'_j = (L_j \times F_j)/(L_j - F_j), (j=1,2)$$ [Equation 1]

where L2' is the gap between the third lens 15a and the photo sensor 13. The magnification of the fourth lens and the third lens is calculated by substituting Equation 1 into the following Equation 2.

$$m_k = \frac{-L'_k}{L_k}, (k=1, 2)$$ [Equation 2]

The size H3 of an image formed on the photo sensor is calculated by substituting the magnification into the following Equation 3.

$$H_{l+1} = m \times H_l, (l=2,3)$$ [Equation 3]

When the calculated value H3 is out of the photo sensor, the distance D between the two lenses or the size of the third lens is reduced within a range in which the third lens can receive all of beams concentrated through the fourth lens, and then the previous processes are repeated. The optical reception system 15 is configured by applying the finally obtained value and the system configured in this way can concentrate line beams to the photo sensor.

By radiating line beams to a measurement area and concentrating beams that are irregularly reflected to the photo sensor, a reception signal is obtained, and a distance value is obtained from the time different between the reception signal and the transmission signal. According to an embodiment, it is possible to detect a vehicle even on a relatively wide road without a rotating unit for laser point beams.

Figure 7:
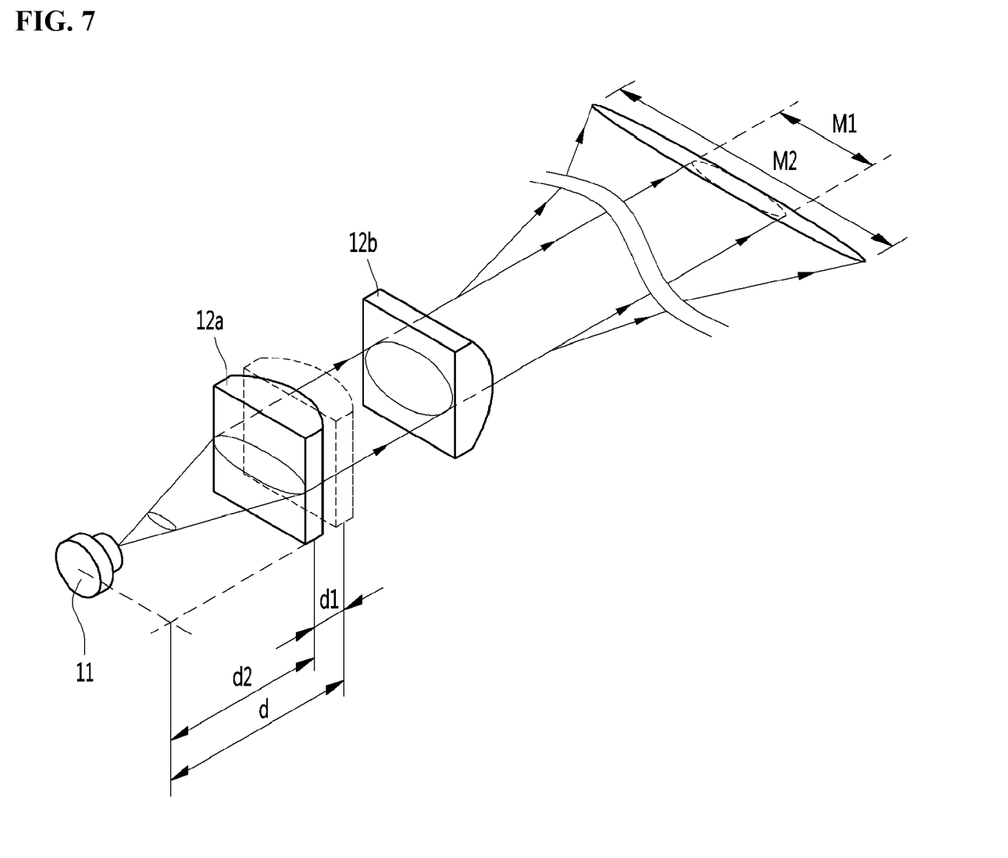
FIG. 7 is a view showing an example of changing the length of a line beam by the laser detection apparatus according to an embodiment.

FIG. 7 is a view showing an example of changing the length of the horizontal axis of a line beam by the laser detection apparatus according to an embodiment.

Referring to FIG. 7, in the laser detection apparatus, the length of the horizontal axis of a line beam can be changed by adjusting the distance between the first lens 12a and the laser source 11. When the gap d between the laser source 11 and the first lens 12a is a focal distance, a laser beam is collimated in parallel. When the gap between the first lens 15a and the laser source 11 is set at d2 by moving the first lens 12a by d1 toward the laser source 11, the changed gap d2 is smaller than d. Accordingly, the length of the horizontal axis of an emitted laser beam becomes M2 by increasing by a predetermined length from M1.

Figure 8:
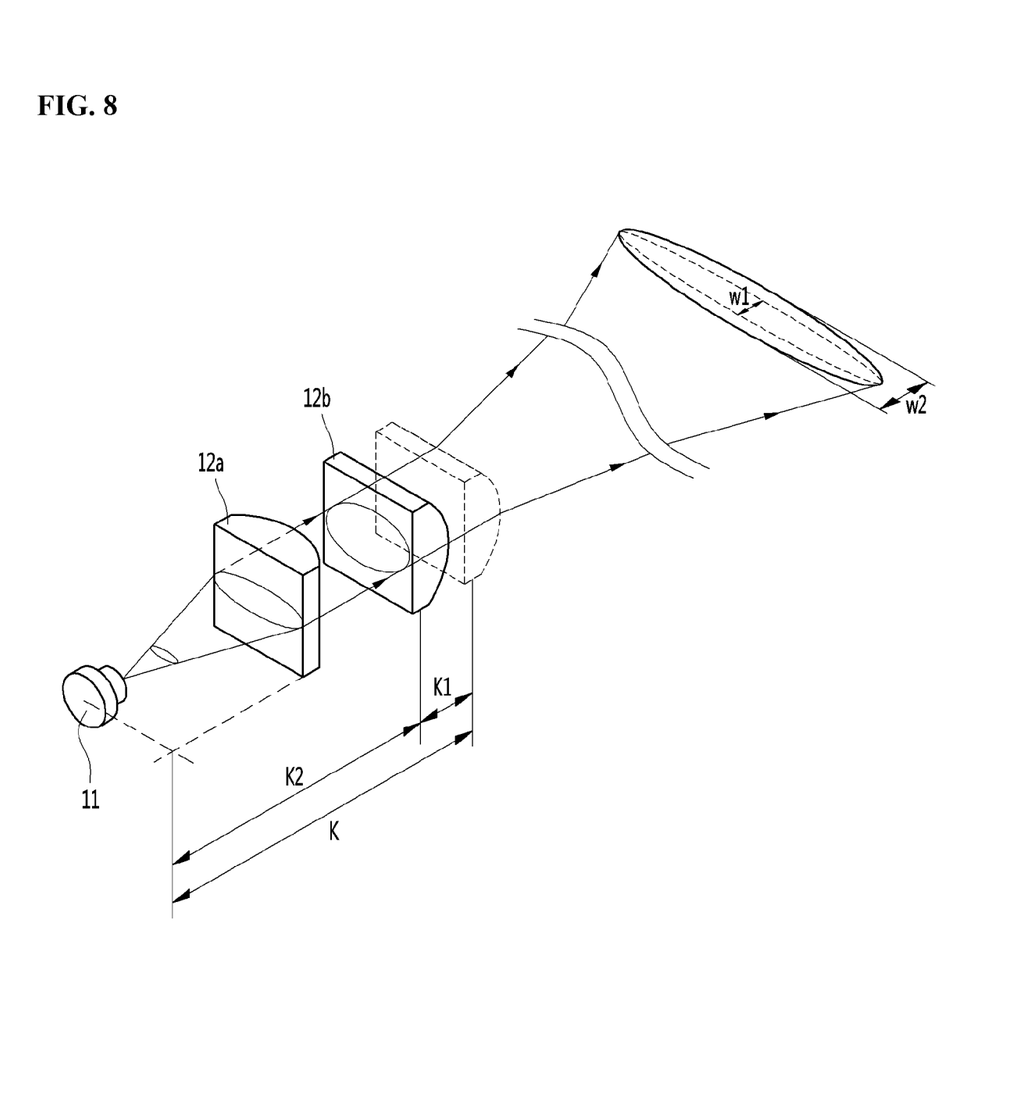
FIG. 8 is a view showing an example of changing the width of a line beam by the laser detection apparatus according to an embodiment.

FIG. 8 is a view showing an example of changing the length of the vertical axis of a line beam by the laser detection apparatus according to an embodiment.

Referring to FIG. 8, in the laser detection apparatus, the length of the vertical axis of a line beam can be changed by adjusting the distance between the second lens 12b and the laser source 11. When the gap K between the laser source 11 and the second lens 12b is a focal distance, a laser beam is collimated in parallel. When the gap between the second lens 15b and the laser source 11 is set at K2 by moving the second lens 12b by K1 toward the laser source 11, the changed gap K2 is smaller than K, so the length of the vertical axis of an emitted laser beam becomes W2 by increasing by a predetermined distance from W1.

That is, according to the laser detection apparatus according to an embodiment, it is possible to change the length of the horizontal axis or the vertical axis of a line beam by changing the position of a lens of the optical transmission system 12 of the optical systems in the apparatus. Accordingly, it is possible to apply the apparatus to all roads without changing the design of the laser detection apparatus, depending on the width of roads.

Figure 9:
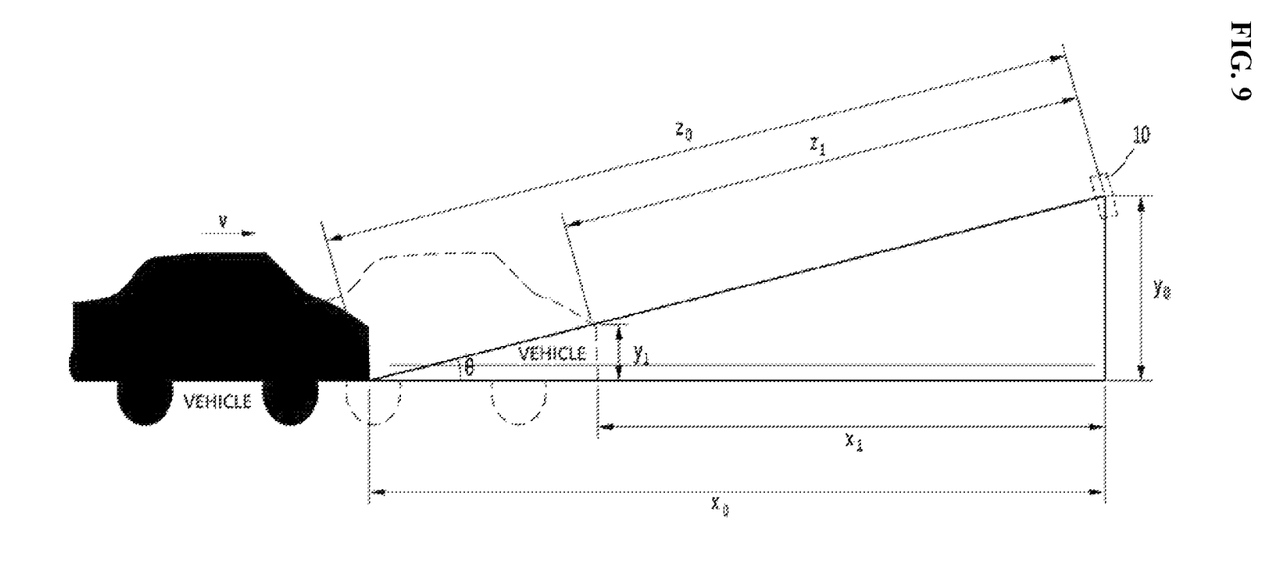
FIG. 9 is a view showing a method of detecting the speed of a passing vehicle, using the laser detection apparatus according to an embodiment.

FIG. 9 is a view showing a method of detecting the speed of a passing vehicle, using the laser detection apparatus according to an embodiment.

Referring to FIG. 9, assuming that the front of a vehicle is vertical and has a height $y_1$, a laser beam radiated from the line beam laser detection apparatus 10 reaches the lower end of the front at the early stage, and the speed of the vehicle can be calculated on the basis of the movement distance of the front.

The speed of a vehicle can be expressed as in the following equation.

$$x_0 - x_1 = (z_0 - z_1) \times \cos\theta, \quad v = \frac{x_0 - x_1}{t} \quad \text{[Equation 4]}$$

where $y_0$ is the vertical distance between the ground and the laser detection apparatus 10, $y_1$ is the height of the portion, which is perpendicular to the ground, of the front of the vehicle, $z_0$ is the distance between the vehicle and the laser detection apparatus when the vehicle is sensed first, $\theta$ is the angle between the ground and the laser detection apparatus, t is a time taken to measure the displacement of the vehicle from $z_0$ to $z_1$, $x_0$ is the distance between the vehicle and a position where a scanner is installed when the vehicle is sensed first, and $x_1$ is the distance between the vehicle and the position where the scanner is installed when the vehicle is sensed after $x_0$. $y_0$ and $y_1$ may be actually measured distances.

The actual movement distance of the front of the vehicle is $x_0 - x_1$, and the speed v of the vehicle can be obtained by dividing the distance $x_0 - x_1$ by the movement time. When the distance when the laser detection apparatus sensed first a vehicle is $z_0$ and measurement was performed at the distance $z_1$ after t seconds, the actual movement distance $x_0 - x_1$ of the vehicle can be obtained by multiplying $z_0 - z_1$ by $\cos\theta$. That is, the speed v of the vehicle can be obtained by dividing the distance $x_0 - x_1$ by t.

As described above, since the laser detection apparatus according to an embodiment can find out the speeds of passing vehicles, it is possible to find out in detail traffic flow such as congestion of vehicles at the area where the laser detection apparatus is positioned. Further, since the optical system of the laser detection apparatus according to an embodiment is configured to form line beams, it is possible to find out the current traffic situation in real time by accurately finding out whether there are vehicles passing through a predetermined area, using the lasers that are radiated from the laser detection apparatus regardless of the sizes of roads.

Although the present invention was described above with reference to the exemplary embodiments, the exemplary embodiments are only examples and do not limit the present invention, and those skilled in the art would know that the present invention may be changed and modified in various ways not exemplified above without departing from the scope of the present invention. For example, the components described in detail in the exemplary embodiments of the present invention may be modified. Further, differences related to the changes and modifications should be construed as being included in the scope of the present invention which is determined by claims.

INDUSTRIAL APPLICABILITY

The laser detection apparatus using line beams according to an embodiment can find out the current traffic situation in real time by accurately finding out whether there are vehicles passing through a predetermined area, using the lasers that are radiated from the laser detection apparatus. Further, it is possible to find out whether there are vehicles passing through a laser radiation area by measuring the distances between the laser detection apparatus and vehicles passing through the laser radiation area, using line beams. Therefore, the present invention has industrial applicability.

The invention claimed is:

1. A laser beam apparatus that is used for detecting vehicles in an intelligent traffic system, the apparatus comprising:
   a light source generating a laser beam pulse;
   an optical transmission system converting the laser beam into a line beam; and
   an optical reception system receiving a beam dispersed rearward and reflected and returned when the line beam is radiated to a vehicle, and calculating a distance value from a reception time difference between the laser beam and the reflected beam,
   wherein a first lens and a second lens that receive a laser from the light source are sequentially arranged in the optical transmission system, and the length of a horizontal axis of the line beam is increased or decreased to fit to the width of a road to be measured, by adjusting the distance between the light source and the first lens,
   wherein the first lens changes the length of the horizontal axis of the line beam and the second lens changes the length of a vertical axis of the line beam.

2. The apparatus of claim 1, wherein the optical reception system includes a third lens and a fourth lens receiving beams reflected from the vehicle and aligned with the third lens, and the distance between the two lenses is adjusted or the size of the third lens is changed such that the third lens can receive all of beams concentrated through the fourth lens by calculating magnification of the third lens and the fourth lens.

3. The apparatus of claim 2, further comprising a photo sensor on which a light passing through the third lens is concentrated.

4. The apparatus of claim 1, wherein when the distance between the first lens and the light source becomes smaller than a focal distance, the length of the horizontal axis of the line beam radiated to an object is increased.

5. The apparatus of claim 1, wherein when the distance between the second lens and the light source becomes smaller than a focal distance, the length of the vertical axis of the line beam radiated to an object is increased.

6. The apparatus of claim 1, wherein assuming that the front of the vehicle is vertical and has a height $y_1$, the line beam reaches first the lower end of the front of the vehicle, the speed of the vehicle is measured on the basis of the movement distance of the front, wherein the speed of the vehicle is expressed as in the following Equation, $$x_0 - x_1 = (z_0 - z_1) \times \cos\theta, v = \frac{x_0 - x_1}{t}$$

where $y_0$ is the vertical distance between the ground and the laser detection apparatus, $y_1$ is the height of the portion, which is perpendicular to the ground, of the front of the vehicle, $z_0$ is the distance between the vehicle and the laser detection apparatus when the vehicle is sensed first, $\theta$ is the angle between the ground and the laser detection apparatus, t is a time taken to measure the displacement of the vehicle from $z_0$ to $z_1$, $x_0$ is the distance between the vehicle and a position where a scanner is installed when the vehicle is sensed first, and $x_1$ is the distance between the vehicle and the position where the scanner is installed when the vehicle is sensed after $x_0$.

7. The apparatus of claim 1, wherein when the distance between the first lens and the light source becomes smaller than a focal distance, the length of the horizontal axis of the line beam radiated to an object is increased.

8. The apparatus of claim 1, wherein when the distance between the second lens and the light source becomes smaller than a focal distance, the length of the vertical axis of the line beam radiated to an object is increased.

9. A laser beam apparatus that is used for detecting vehicles in an intelligent traffic system, the apparatus comprising:
a light source generating a laser beam of a pulse;
an optical transmission system converting the laser beam into a line beam; and
an optical reception system receiving a beam dispersed rearward and reflected and returned when the line beam is radiated to a vehicle, and calculating a distance value from a reception time difference between the laser beam and the reflected beam,
wherein a first lens and a second lens that receive a laser from the light source are sequentially arranged in the optical transmission system, wherein the first lens changes the length of the horizontal axis of the line beam and the second lens changes the length of a vertical axis of the line beam.

10. The apparatus of claim 9, wherein the optical reception system includes a third lens and a fourth lens receiving beams reflected from the vehicle and aligned with the third lens, and the distance between the two lenses is adjusted or the size of the third lens is changed such that the third lens can receive all of beams concentrated through the fourth lens by calculating magnification of the third lens and the fourth lens.

11. The apparatus of claim 10, further comprising a photo sensor on which a light passing through the third lens is concentrated.

12. The apparatus of claim 9, wherein when the distance between the first lens and the light source becomes smaller than a focal distance, the length of the horizontal axis of the line beam radiated to an object is increased.

13. The apparatus of claim 9, wherein when the distance between the second lens and the light source becomes smaller than a focal distance, the length of the vertical axis of the line beam radiated to an object is increased.

14. The apparatus of claim 9, wherein assuming that the front of the vehicle is vertical and has a height $y_1$, the line beam reaches first the lower end of the front of the vehicle, the speed of the vehicle is measured on the basis of the movement distance of the front, wherein the speed of the vehicle is expressed as in the following Equation, $$x_0 - x_1 = (z_0 - z_1) \times \cos\theta, v = \frac{x_0 - x_1}{t}$$

where $y_0$ is the vertical distance between the ground and the laser detection apparatus, $y_1$ is the height of the portion, which is perpendicular to the ground, of the front of the vehicle, $z_0$ is the distance between the vehicle and the laser detection apparatus when the vehicle is sensed first, $\theta$ is the angle between the ground and the laser detection apparatus, t is a time taken to measure the displacement of the vehicle from $z_0$ to $z_1$, $x_0$ is the distance between the vehicle and a position where a scanner is installed when the vehicle is sensed first, and $x_1$ is the distance between the vehicle and the position where the scanner is installed when the vehicle is sensed after $x_0$.

15. The apparatus of claim 9, wherein a length of a horizontal axis of the line beam is increased or decreased to fit to the width of a road to be measured, by adjusting the distance between the light source and the first lens.

16. The apparatus of claim 9, wherein the first lens changes the length of the horizontal axis of the line beam and the second lens changes the length of a vertical axis of the line beam.

17. A laser beam apparatus that is used for detecting vehicles in an intelligent traffic system, the apparatus comprising:
a light source generating a laser beam of a pulse;
an optical transmission system converting the laser beam into a line beam; and
an optical reception system receiving a beam dispersed rearward and reflected and returned when the line beam is radiated to a vehicle, and calculating a distance value from a reception time difference between the laser beam and the reflected beam, wherein a first lens and a second lens that receive a laser from the light source are sequentially arranged in the optical transmission system, wherein assuming that the front of the vehicle is vertical and has a height $y_1$, the line beam reaches first the lower end of the front of the vehicle, the speed of the vehicle is measured on the basis of the movement distance of the front, wherein the speed of the vehicle is expressed as in the following Equation, $$x_0 - x_1 = (z_0 - z_1) \times \cos\theta, \quad v = \frac{x_0 - x_1}{t}$$

where $y_0$ is the vertical distance between the ground and the laser detection apparatus, $y_1$ is the height of the portion, which is perpendicular to the ground, of the front of the vehicle, $z_0$ is the distance between the vehicle and the laser detection apparatus when the vehicle is sensed first, $\theta$ is the angle between the ground and the laser detection apparatus, t is a time taken to measure the displacement of the vehicle from $z_0$ to $z_1$, $x_0$ is the distance between the vehicle and a position where a scanner is installed when the vehicle is sensed first, and $x_1$ is the distance between the vehicle and the position where the scanner is installed when the vehicle is sensed after $x_0$.

18. The apparatus of claim 17, wherein the optical reception system includes a third lens and a fourth lens receiving beams reflected from the vehicle and aligned with the third lens, and the distance between the two lenses is adjusted or the size of the third lens is changed such that the third lens can receive all of beams concentrated through the fourth lens by calculating magnification of the third lens and the fourth lens.

19. The apparatus of claim 17, further comprising a photo sensor on which a light passing through the third lens is concentrated.

* * * * *